(No Model.)
A. W. OBERMANN.
COOKING VESSEL.
No. 254,500. Patented Mar. 7, 1882.
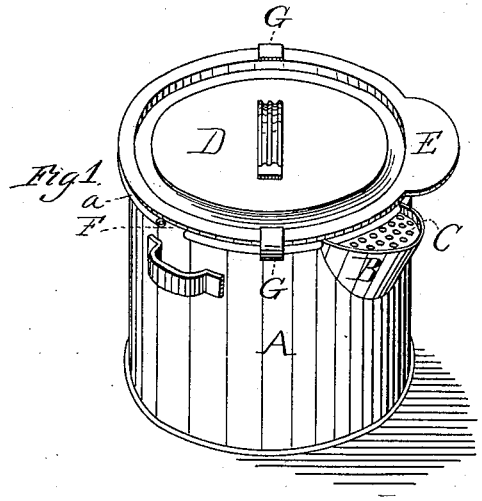
Fig. 1.
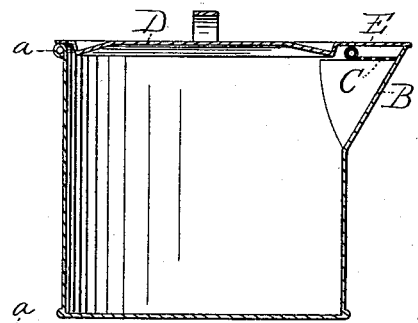
Fig. 2.
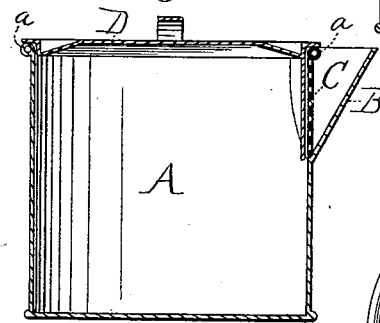
Fig. 4.
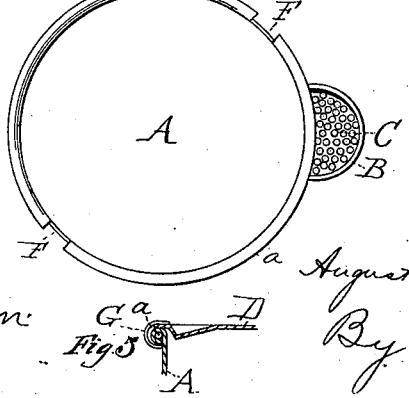
Fig. 3.
Fig. 5.
Witnesses—
F. B. Townsend
F. W. Kasehagen
Inventor—
August W. Obermann
By Lotz & Dyer,
Attys.

UNITED STATES PATENT OFFICE.

AUGUST W. OBERMANN, OF CHICAGO, ILLINOIS.

COOKING-VESSEL.

SPECIFICATION forming part of Letters Patent No. 254,500, dated March 7, 1882.

Application filed November 16, 1880. Renewed July 29, 1881. (No model.)

*To all whom it may concern:*

Be it known that I, AUGUST W. OBERMANN, of Chicago, in the county of Cook and State of Illinois, have invented a certain new and useful Improvement in Cooking-Vessels, of which the following is a specification.

The object I have in view is to produce a simple and cheap cooking-vessel of such construction that the water can be drained from the articles being cooked without the necessity of lifting the cover from the vessel or of holding the cover by hand onto the vessel, and in the use of which there will be no danger of spilling the articles, and, further, in which the steam can be allowed to escape and the articles being cooked can be supplied with additional water without raising the cover.

My invention consists in the peculiar devices and combinations of devices employed by me for this purpose, all as fully hereinafter explained, and pointed out by the claims.

In the accompanying drawings, forming a part hereof, Figure 1 is a perspective view of the vessel, showing the cover locked thereto and turned to permit the water to be drained from the articles, to let off the steam, or to supply additional water; Fig. 2, a vertical section through the vessel when the cover is turned to close the lip or spout; Fig. 3, a top view of the vessel with the cover removed; Fig. 4, a vertical section of a modified form of the device; Fig. 5, a cross-section of the wired edge of the vessel and the edge of the cover, showing one of the locking-hooks.

Like letters denote corresponding parts in all the figures.

A is the cooking-vessel, made preferably of sheet metal, but which can be constructed of cast metal or of earthenware. The upper open end of the vessel is of circular form, and has a lip or wide spout, B, on one side thereof, which rises even with the top edge of the vessel. This lip is provided with a perforated plate, C, secured therein either horizontally, as shown in Figs. 1, 2, 3, or vertically, as shown in Fig. 4.

D is the cover, which has preferably a horizontal flap, E, projecting from its edge, of such shape and size that it will close the lip B when placed over it.

The upper edge of the vessel has a flange, *a*, which is cut away at two points to form notches F. On the edge of the cover D are downwardly-projecting hooks G, which embrace the flange of the vessel and lock the cover thereto. The notches F are preferably so arranged that when the hooks G of the cover rest in such notches the flap E will cover the lip B. By turning the cover axially on the vessel the lip will be opened and the cover will be locked to the vessel, so that the water can be drained from the articles in the vessel without holding on the cover by hand. The notches can, however, be so located that when the cover is placed on the vessel it will be necessary to turn it slightly in order to cover the lip, and the cover will thereby be locked to the vessel, a further turning or twisting of the cover being required to open the lip.

Instead of the horizontal flap, a vertical flap, Fig. 4, can be used, which would project down from the cover on the inside of the vessel; but I prefer the horizontal flap, for the reason that it is in sight and its position can be seen at a glance.

Instead of providing the cover with hooks and the vessel with a flange and notches, these parts can be reversed and the vessel be provided with hooks and the cover with a notched edge.

The lip can be opened to let off steam or to supply additional water without raising the cover from the vessel, as before stated.

The convenience in use of this cooking-vessel will be apparent on inspection without further explanation.

What I claim as my invention is—

1. A cooking-vessel, A, having a lip, B, provided with a strainer, C, in combination with the cover D, having the flap E projecting therefrom, whereby the lip can be opened and closed by twisting the cover on the vessel without removing it therefrom, substantially as described and shown.

2. A cooking-vessel having lip B, perforated plate C, flange *a*, and notches F, in combination with the cover D, provided with a flap projecting therefrom for closing the lip, the cover being locked to and unlocked from the vessel and the lip being closed and unclosed by the twisting of the cover on the vessel, substantially as described and shown.

AUGUST W. OBERMANN.

Witnesses:
OLIVER W. MARBLE,
F. W. KASEHAGEN.